United States Patent [19]
Garnett

[11] 3,804,120
[45] Apr. 16, 1974

[54] ELECTRICALLY OPERATED HYDRAULIC CONTROL VALVE

[76] Inventor: Bruce L. Garnett, Route 2, Depere, Wis. 54115

[22] Filed: Dec. 26, 1972

[21] Appl. No.: 317,924

[52] U.S. Cl. .......................................... 137/625.64
[51] Int. Cl. ..................... F16k 11/07, F16k 31/383
[58] Field of Search....... 137/625.6, 625.63, 625.64; 251/130

[56] References Cited
UNITED STATES PATENTS

| | | | |
|---|---|---|---|
| 2,732,860 | 1/1956 | Ray | 137/625.64 |
| 2,460,908 | 2/1949 | Scott | 137/625.64 |
| 2,700,986 | 2/1955 | Gunn | 251/130 X |
| 2,641,279 | 6/1953 | Baldwin | 137/625.6 |
| 2,961,001 | 11/1960 | Pippenger | 137/625.63 |
| 3,040,768 | 6/1962 | Pippenger | 137/625.64 X |
| 3,132,685 | 5/1964 | McKinnon | 251/130 X |
| 3,191,626 | 6/1965 | Leibfritz | 137/625.64 X |

*Primary Examiner*—Henry T. Klinksiek
*Attorney, Agent, or Firm*—James E. Nilles

[57] ABSTRACT

An electrically operated hydraulic control valve including a valve body having an open ended bore, an inlet passage, a pair of fluid flow passages and a return passage connected to said bore, a valve spool mounted in said bore to control the fluid flow from said inlet passage to said flow passages and return passages, and a solenoid controlled pressure circuit connected to control the position of the valve spool in the bore, said pressure circuit including a pressure reducing valve to maintain reduced pressure in the control circuit, and a pair of solenoid operated valves which are selectively operable to reduce the pressure at one end of the bore to allow the pressure at the other end of the bore to move the valve spool.

10 Claims, 1 Drawing Figure

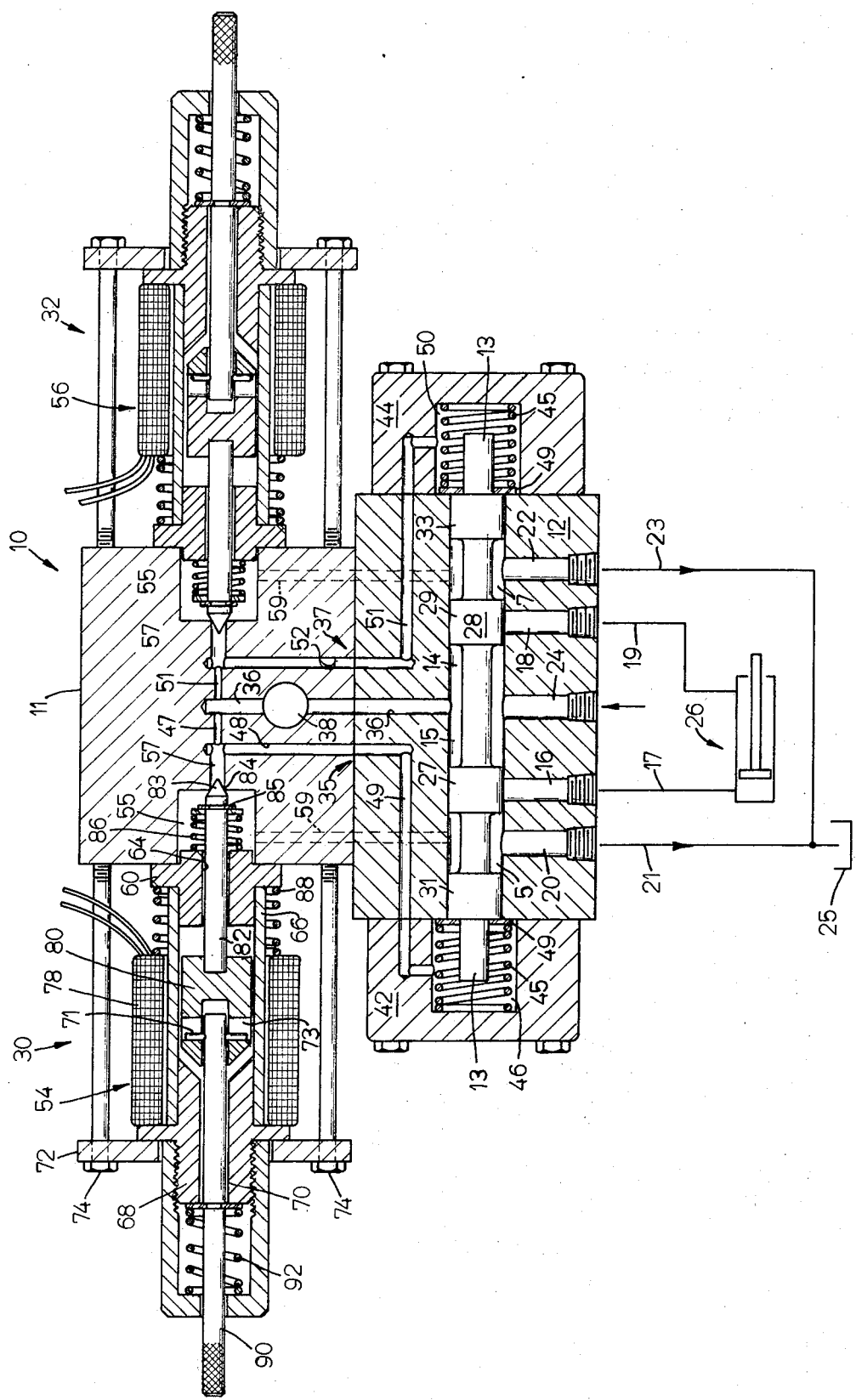

ELECTRICALLY OPERATED HYDRAULIC CONTROL VALVE

SUMMARY OF THE INVENTION

The electrically operated hydraulic control valve of the present invention provides a low-cost, economical modulating valve to control the flow of high pressure fluid to a hydraulically actuated device. The valve includes a main valve spool for controlling the high pressure fluid flow and a low-pressure fluid circuit for controlling the position of the valve spool. The low pressure fluid circuit is controlled by solenoid actuated valves which provide accurate movements of the valve spool. The control circuit utilizes a unique control arrangement for moving the valve. In this regard, low pressure fluid chambers are provided at each end of the valve spool to balance the valve spool in a neutral position. Vavle spool movement is accomplished by relieving pressure in one of the chambers so that the valve moves in response to the pressure in the other chamber.

THE DRAWING

The drawing shows a cross sectional view of the electrically operated control valve of the present invention with the valve spool located in a neutral position.

DESCRIPTION OF THE INVENTION

The electrically operated hydraulic valve 10 of this invention is shown connected to actuate a double acting hydraulic piston and cylinder device 26. Although a double acting cylinder device is shown, the valve can be used to control any other hydraulically actuated device. The valve 10 generally includes a housing 12 having a bore 14, fluid flow passages 16 and 18 connected to the device 26 by lines 17 and 19 respectively and return passages 20 and 22 connected to a reservoir or tank 25 by lines 21 and 23 respectively. Fluid under pressure is admitted to the bore 14 through an inlet passage 24 and is controlled by means of a valve spool 28 mounted for axial movement in the bore 14.

In this regard, the valve spool 28 is provided with flow control lands 27 and 29 which are located in a position to control the flow of fluid through passages 16 and 18 and define a fluid pressure chamber 15 within the bore 14. The ends of the bore 14 are closed by means of lands 31 and 33 provided at each end of valve spool 28 and define low pressure chambers 5 and 7 at each end of the bore 14.

The operation of the valve spool is generally well known. Movement of the valve spool 28 to the left will connect the fluid inlet passage 24 to the passage 16 and will connect the passage 18 through the low pressure chamber 7 to the passage 22. Movement of the valve spool 28 to the right will connect the inlet passage 24 through the high pressure chamber 15 to the passage 18 and will connect the passage 16 through the low pressure chamber 5 to the fluid return passage 20. An extension 13 extends axially outwardly from each end of the valve spool 28. Although seals are not shown in the drawing, it should be understood that the valve spool lands are self sealing and any other fluid connections are provided with seals as required.

In accordance with the invention, the position of the valve spool 28 is controlled by means of electric control assemblies 30 and 32 which are operatively connected to control fluid circuits 35 and 37, respectively, provided in a fluid circuit block 11 mounted on the housing 12. The fluid flow circuits 35 and 37 are connected to the bore 14 through a control passage 36 provided in the block 11 and housing 12. Fluid pressure in the flow control circuits 35 and 37 is maintained constant by means of a pressure reducing valve 38 provided in the passage 36. The pressure reducing valve 38 controls the maximum pressure in the passage 36.

Means are provided for initially biasing the valve spool 28 to a central position in the bore 14. Such means is in the form of a spring 45 and a washer 49 provided in each of the chambers 46 and 50. The washer 49 is mounted on the extension 13 in a position to abut the land 31 or 33. The spring 45 is positioned between the washer 49 and the end of the chamber 46 or 50. Whenever the valve spool 28 is moved to the right or left, one of the lands 31 or 33 will engage the washer compressing the corresponding spring in the direction of movement of the valve spool.

The valve spool 28 is moved in the bore 14 by varying the fluid pressure on one or the other end of the spool valve. This is accomplished by providing fluid pressure cylinders 42 and 44 on each end of the housing 12. The pressure cylinder 42 includes a pressure chamber 46 connected to the bore 14. The pressure cylinder 44 includes a pressure chamber 50 connected to the other end of the bore 14.

Means are provided for equalizing fluid pressure in the chambers 46 and 50. Such means is in the form of the fluid flow circuits 35 and 37 which are connected to the passage 36 and to the chambers 46 and 50, respectively. The flow circuit 35 includes a flow orifice 47 and a flow passage 48 in block 11 of a connecting passage 49 in housing 12. The flow circuit 37 includes a flow orifice 51 and a flow passage 52 in block 11 and a connecting passage 51 in housing 12. As pressure builds up in pressure chamber 15, an equal pressure will build up in chambers 46 and 50 through the pressure reducing valve 38. Since all of the forces acting on each end of the valve spool are equal, the valve spool will remain in a centered position in the bore 14.

The position of the valve spool 28 in the bore 14 is changed by dropping the pressure in either of the chambers 46 or 50. This is accomplished by means of solenoid controlled valve assemblies 54 and 56 which are connected to bypass fluid from passages 48 or 52 to tank 25. In this regard, each of the solenoid valve assemblies 54 and 56 is positioned to bypass fluid from passage 48 through a bore 57 in block 11 to tank 25 by a passage 59 in block 11 and housing 12.

The electric control assemblies 30 and 32 are identical and the following description refers to the operating of assembly 30 although like parts have the same numbers in each of these assemblies. Electric control assembly 30 includes a cap 60 having a central bore 64 mounted on the block 11 at the end of a chamber 55 provided in block 11. A sleeve 66 is mounted on the end cap 60 and extends axially outwardly from the chamber 55. A guide cap 68 having a central passage 70 is mounted on the end of the sleeve 66. The end cap 60, sleeve 66 and guide cap 68 are retained on the housing by a hold-down ring 72 provided on the guide cap 68 and a number of bolts 74 threadedly received in corresponding openings in fluid circuit block 11.

A coil 78 is mounted on the sleeve 66 and an armature 80 is mounted for axial movement in sleeve 66. A valve stem 82 is connected to the armature 80 and extends through the opening 64 in the end cap 60 with the end 83 of the valve stem 82 seated on the valve seat 84 provided at the end of passage 57. The valve stem 82 is biased into engagement with the valve seat 84 by means of a spring 86 positioned between cap 60 and spring retainer 85. The coil 78 is biased into engagement with the guide cap 68 by means of a spring 88.

It should be apparent that by energizing the coil 78 the armature 80 will be pulled away from the valve seat 84 at the end of the passage 59 against the bias of spring 86. The pressure of the fluid in bore 57 acts against valve stem 82 allowing fluid to flow into chamber 55. The fluid is discharged to tank 25 through passage 59, low pressure chamber 5 and return passage 20. The drop in pressure in the passage 48 will allow the pressure of the fluid in the chamber 50 to move the pilot valve 28 to the left. It is possible to accurately control the amount of fluid metered past the valve stem 82 to provide very accurate control of the valve spool 28.

Manual actuation of the valve stem 82 is provided by means of a manual control rod 90 positioned in the passage 70 in the guide cap 68. A lost motion connection in the form of a pin 71 and a slot 73 in the armature 80 is provided between the armature 80 and the rod 90 so that the armature is free to move under normal operating conditions without moving the manual control rod 90. The manual control rod 90 is biased to an inoperative position by means of a spring 92 provided between spring retainer 94 on rod 90 and cap 96 mounted on guide cap 68.

OPERATION

Referring to the drawing, the hydraulic valve 10 is initially pressurized by applying pressure to the inlet passage or port 24 from a fluid pressure source (not shown). High pressure fluid enters the chamber 15 and passes through control passage 36 to the pressure reducing valve 38. Fluid at a reduced pressure established by the pressure reducing valve then passes through the ports 47 and 51 and into passages 48 and 52 to chambers 46 and 50, respectively. An equal pressure will be established in each of the chambers 46 and 50 to balance the valve spool 28 in the bore 14. It should be noted that the springs 45 are used to initially center the valve spool 28 and that the pressure of the fluid in the chambers 46 and 50 must provide a force greater than the spring force in order to produce movement of the valve spool 28.

If the valve spool 28 is to be moved to the left in the drawing, the solenoid 54 is energized to move the armature 80 to the left. The movement of the armature 80 will pull the rod 82 away from the bore 57 against the bias of spring 86 allowing fluid in the passage 48 to flow through the bypass passage 59 to the tank 25. The drop of pressure in chamber 46 reduces the force acting on the left end of the valve spool 28 and the pressure of the fluid in chamber 50 will move the valve spool to the left. High pressure fluid will flow from the inlet port 24 through the chamber 15 to the flow passage or port 16. The fluid from the device 26 will flow through the line 19 to flow port 18, through chamber 7 and return port 22 into the tank 25.

The amount of movement of the valve spool will depend on the rate of the pressure drop in the chamber 46. The small bore 47 acts to retard fluid flow to passage 48 so that pressure cannot build up in chamber 46 when bore 57 is open. Once the pressure in the system is equalized, the valve spool will remain in a fixed position until the solenoid is deenergized. Closing of the port 57 will allow the pressure of the fluid in chamber 46 to again build up to the same pressure as the fluid in chamber 50.

I claim:

1. An electrically operated hydraulic control valve comprising:
    a valve body having a bore,
    an inlet port and an outlet port connected to said bore,
    a valve spool mounted in said bore for controlling the flow of hydraulic fluid from said inlet port to said outlet port,
    a chamber at each end of said bore,
    passage means connecting said inlet port to said chambers to provide a balanced pressure at each end of said valve spool,
    and a solenoid controlled valve connected to said passage means to selectively relieve pressure in one or the other of said chambers to displace said valve spool a distance determined by the pressure differential between the fluid in the chambers.

2. The hydraulic valve according to claim 1 including means in said chambers for biasing said valve spool to a centered position within said valve body.

3. The hydraulic valve according to claim 1 including a pressure reducing valve in said passage means for maintaining a reduced pressure in said chambers.

4. An electrically operated hydraulic control valve comprising:
    a valve body having an open ended bore,
    an inlet passage,
    a pair of flow passages and a return passage connected to said bore,
    a valve spool positioned in said bore to control the flow of hydraulic fluid from said inlet passage to said flow passages and said return passages,
    a cylinder block mounted on said body and having a chamber located at each end of said bore,
    means in each chamber for biasing said valve spool to a neutral position in said bore,
    passage means connecting each of said chambers to said inlet passage to provide equal fluid pressure in said chambers,
    and a solenoid controlled valve operatively connected to each of said chambers for controlling the pressure in said chamber whereby said valve spool will be displaced a distance proportional to the pressure differential of the fluid in the chambers.

5. The hydraulic valve according to claim 4 including means in said passage means for controlling the maximum pressure in said chambers.

6. The hydraulic valve according to claim 4 including means for manually overriding said solenoid controlled valves to control the pressure in said chambers.

7. The hydraulic valve according to claim 6 including means for providing a lost-motion connection between said manual control means and said solenoid controlled valve.

8. An electrically operated hydraulic control valve comprising:
    a valve body having an open ended bore,
    an inlet passage,
    a pair of flow passages, and a pair of return passages connected to said bore, a cylinder block mounted on said valve body at each end of said bore, each block including a chamber located at the end of said bore, a passage connecting each of said chambers to said inlet passage, a valve spool mounted for axial movement in said bore, and electrically controlled valve means for controlling the pressure of the fluid in said chambers, the pressure differential between said chambers determining the position of the spool valve in said bore.

9. The hydraulic valve according to claim 8 wherein said passage means includes a control passage in said valve body connected to said bore, a passage connecting each of said chambers to said control passage, a bypass passage connecting each of said chamber passages to said return passages, and an electrically controlled solenoid valve connected to each of said bypass passages for selectively relieving the pressure in each of said chambers.

10. The hydraulic valve according to claim 8 including means in said chambers for biasing said valve spool to a neutral position.

* * * * *